Dec. 25, 1945.    L. F. BEACH    2,391,442
GYROMAGNETIC COMPASS
Filed March 21, 1942    2 Sheets-Sheet 1
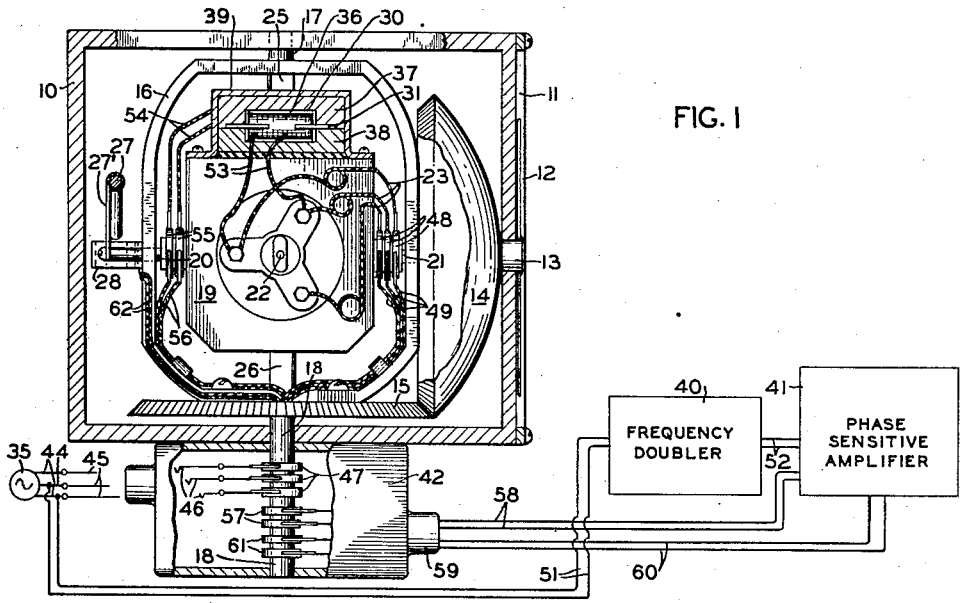
INVENTOR
LENNOX F. BEACH
BY
Herbert P. Thompson
his ATTORNEY Dec. 25, 1945.   L. F. BEACH   2,391,442
GYROMAGNETIC COMPASS
Filed March 21, 1942   2 Sheets-Sheet 2
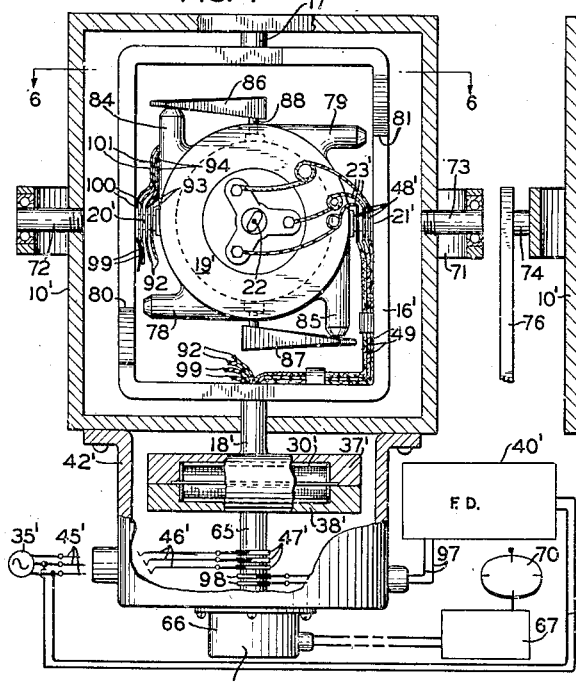
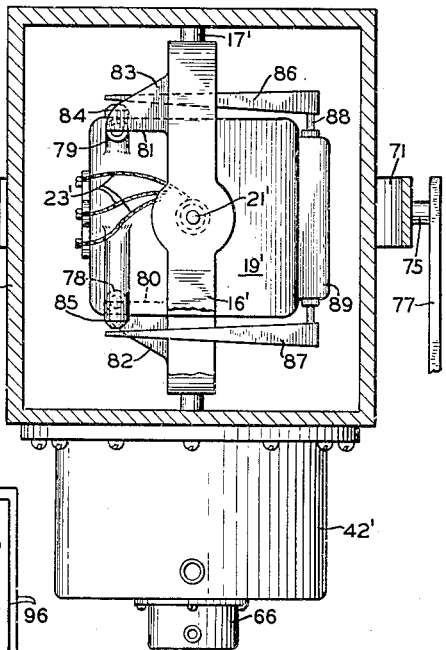
SELSYN TRANSMITTER
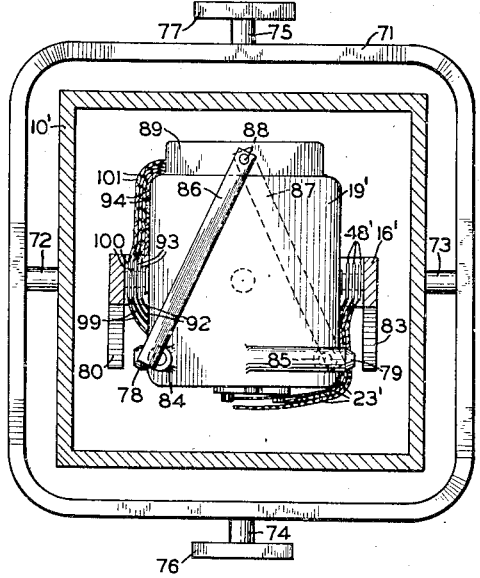
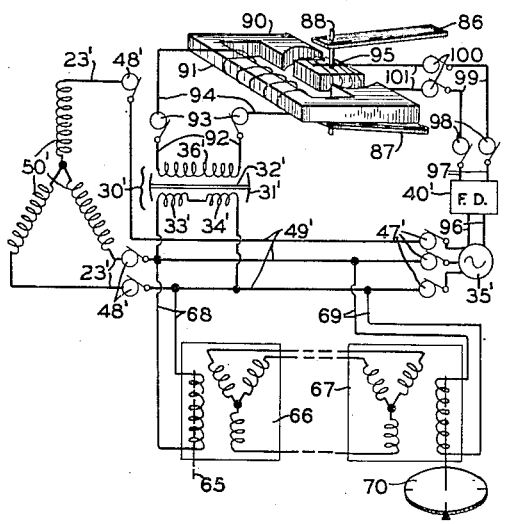
INVENTOR
LENNOX F. BEACH
BY
Herbert P. Thompson
his ATTORNEY Patented Dec. 25, 1945

2,391,442

UNITED STATES PATENT OFFICE 2,391,442

GYRO MAGNETIC COMPASS

Lennox F. Beach, Merrick, N. Y., assignor to Sperry Gyroscope Company, Inc., Brooklyn, N. Y., a corporation of New York Application March 21, 1942, Serial No. 435,622

5 Claims. (Cl. 33—226)

This invention relates to gyro magnetic compasses and particularly to an instrument in which a flux valve compass and directional gyro are combined.

One of the features of the invention resides in incorporating a flux valve in a directional gyro instrument and so physically relating the same that the compass is positioned in azimuth by the gyro.

Another feature of the invention is contained in the means employed for controlling the directional gyro from the output of the flux valve.

Still a further feature of the invention consists in the utilization of a universal mounting on which a housing containing the herein combined units is pendulously supported.

Other features and structural details of the invention will be apparent from the following description when read in connection with the accompanying drawings, wherein Fig. 1 is an elevation view of an instrument embodying the features of the present invention, the enclosing case for the instrument being broken away where desired to show the arrangement and construction of the interior parts. This view also includes a showing of the electrical elements employed with the instrument and the circuits therefor.

Fig. 2 is a detail elevation of the improved instrument taken at right angles to the showing of the same contained in Fig. 1.

Fig. 2A is a fragmentary detail plan view, partially broken away, of the gyro-levelling nozzle which extends laterally from the rotor bearing casing of the gyro.

Fig. 2B is a sectional view of the nozzle of Fig. 2A taken in about the plane 2B—2B thereof.

Fig. 3 is a wiring diagram including the electrical parts of the gyro compass instrument shown in both Figs. 1 and 2.

Fig. 4 is a view similar to Fig. 1 showing a modified form of instrument embodying the present inventive concepts.

Fig. 5 is a detail elevation of the instrument taken at right angles to the showing of the same contained in Fig. 4.

Fig. 6 is a sectional view taken on line 6—6, in Fig. 4, and illustrated in Figs. 4 and 5, and Fig. 7 is a wiring diagram showing the arrangement of the electrical parts of the instrument illustrated in Figs. 4, 5 and 6, and including a perspective view of the moving coil meter employed in this form of the invention.

With reference particularly to Figs. 1 to 3, inclusive, the improved gyro compass instrument includes a directional gyro of conventional form which is provided with an enclosing casing 10, the front part of which contains a window 11 through which a rotatable compass card 12 is visible to the observer of the instrument. Card 12 is mounted on a stub shaft 13, journaled in the casing 10, and is driven in the present instance by an internally located cup-shaped gear 14 which, in turn, meshes with bevel gear 15. The last named gear is rotatably mounted and in the illustrative construction shown forms an integral portion of the conventional vertical ring 16 employed in this type of gyroscopic instrument. Ring 16 includes the usual vertically extending trunnions 17 and 18 by which the same is journaled within the enclosing casing 10 of the instrument. Further, the gyro instrument includes a gyro rotor bearing case 19 which is pivotally mounted on the ring 16 by means of horizontally extending trunnions 20 and 21. The gyro rotor (not shown) is situated within the bearing case 19, the rotor spinning on a normally horizontal axis which is normal to the plane of the paper when viewed in Fig. 1 and is located in a position therein shown by the extending end of the rotor shaft indicated at 22. In operation, the spin axis of the rotor is preferably arranged in an east-west plane whereby the means, hereinafter described for correcting for tilt of the rotor bearing case, will correct for tilt thereof about a north-south axis which tilt, if present, would produce greatest error in the output of the flux valve mounted thereon. Suitable driving means are provided to spin the gyro rotor, in the present instance, the same being in the form of a motor (not shown) which is supplied with alternating current by way of leads 23 from a suitable source of electrical energy as hereinafter more particularly described.

A torque exerting means for correcting the tilt of the rotor bearing case 19 about its horizontal axis defined by trunnions 20 and 21, such correction being effected pneumatically in the present instance and being provided for, is illustrated in Fig. 2, by a nozzle piece 24 which extends laterally from and is mounted on the bearing case 19. The nozzle 24 is suitably supplied with air from a small centrifugal pump unit (not shown) contained within the case 19, the pump being driven by the spinning gyro rotor. The end of nozzle piece 24 is provided with oppositely directed ports from which air is exhausted, the air normally impinging against two curved knife edge defining members 25 and 26 mounted in fixed parallel relation and located on the vertical ring 16. Members 25 and 26 are arranged on either side of the two port nozzle 24 and operate to differentially intercept the air issuing therefrom, upon inclination of the case 19 from a normal position on its horizontal axis, so that a torque is exerted about the vertical axis of the ring 16 defined by trunnions 17 and 18 which corrects the tilt of the case 19 in a manner well understood in the art. Other means for accomplishing this result in the improved instrument may be employed without departing from the inventive concepts herewith disclosed.

In the form of the invention shown in Figs. 1 to 3, inclusive, the precessing means for changing the azimuthal position of the gyro is electromagnetic and includes a curved permanent magnet element 27 mounted on a radially extending arm 27' that is fixed to an extending portion of trunnion 20. The cooperating element of the precessing means is constituted of two series connected solenoids 28 and 29 which are fixed in position on the vertical ring 16. Magnetic member 27 provides a core or plunger for the respective solenoids and the same is urged either in a counterclockwise or clockwise direction as viewed in Fig. 2 when the solenoids are rendered effective depending on the polarity of the magnetic field caused by the energized solenoids. The precessing means is consequently operative to exert a torque about the axis of the rotor bearing case 19 to effect the desired movement of the vertical ring 16 in a manner well understood in the art. The control of the compass unit employed in the improved instrument over the described type of directional gyro is exerted through the precessing means, and the azimuthal position of the vertical ring 16 with respect to the earth's magnetic field or alternatively the position of the card 12 with respect to its associated lubber line is consequently determined.

A flux valve unit is incorporated in the present instrument and provides the controlling means therefor. In the drawings, Figs. 1 to 3, inclusive, I show a flux valve indicated generally at 30 which is of the two legged type. A flux valve of this character is employed herein in an illustrative manner, it being understood that the invention is not limited in use to an instrument utilizing this specific type of compass. Reference is made to my copending application Serial No. 404,809, filed July 31, 1941, for a complete description of the construction and operation of a two legged flux valve. For the purpose of the present description, this unit includes circularly shaped field collectors 31 mounted in the respective ends of a straight magnetic flux conducting core 32. Situated midway between the field collectors 31 and encircling the core 32 is a coil element constructed to include the opposed exciting or primary windings 33 and 34 of the flux valve instrument, the same being energized from a suitable source of alternating current energy such as indicated at 35, as hereinafter more particularly described. The coil element also includes a secondary winding, as indicated at 36, which provides the output by which the improved instrument is controlled.

It will be understood that the voltage output of the type of flux valve described varies in magnitude as the instrument rotates in azimuth in the earth's magnetic field and the output reverses in phase sense when the position of the flux valve is reversed in said magnetic field, and these properties of the flux valve are employed in effecting the desired control of the instrument through means hereinafter more particularly described. As shown in Figs. 1 and 2, the described flux valve unit employed is mounted between two adjoining rectangularly shaped holding members 37 and 38 which are made hollow to receive the same. A cover 39 is employed for the members 37 and 38 which is fixed in position in the present instance upon the top of the rotor bearing case 19. The flux valve is consequently mounted in a normally horizontal plane and is positioned by the directional gyro in azimuth in correspondence with the vertical ring 16 thereof.

A frequency doubler and a phase sensitive amplifier of suitable electrical form are employed in the circuit arrangement for the improved instrument, the same being respectively indicated at 40 and 41. Also a box 42 enclosing a jack 46 is mounted in a suitable manner in the present instance upon the base of the enclosing casing 10.

The circuit arrangements employed in the described gyro compass instrument include leads 44 from the source 35 to a suitable plug 45 and jack 46 connections associated with box 42. From the jack 46, energy is supplied to the motor, for spinning the gyro rotor of the instrument, by way of slip rings 47 and 48 which are connected by leads 49. The windings for the motor adapted to spin the gyro rotor are shown in Fig. 3 at 50.

The phase sensitive amplifier is energized from the source 35 through the frequency doubler 40 by way of leads 51 and 52, respectively.

A continuous supply of energy is supplied the flux valve exciting windings 33 and 34 by way of leads 53 which join the leads 23 receiving energy through the slip rings 48. The output of the flux valve compass 30 is fed to the phase sensitive amplifier 41 by way of leads 54, slip rings 55, leads 56, slip rings 57 and finally the leads 58 through a suitable jack and plug connection 59 at box 42.

The output of the phase sensitive amplifier 41 in this form of the invention determines the controlling effort exerted upon the gyro precessing means. Other means which are equally effective in response to a variation in the output of the flux valve due to a change in the azimuthal position of the same in the earth's field may be employed to obtain the desired result without departing from the inventive concepts herewith disclosed. An alternative method for obtaining this control is shown in the modified form of the invention hereinafter described. The output of phase sensitive amplifier 41 is led to the series connected solenoids 28 and 29 by way of leads 60, plug and jack connection 59, through slip rings 61 and leads 62. As shown in Fig. 1 the slip rings 47, 57 and 61 are all contained on an extending portion of trunnion 18 which in this instance is made hollow and the respective leads 49, 56 and 62 issue therefrom.

The instrument operates under control of the flux valve 30 which moves away from an original position in azimuth in the earth's magnetic field due to wandering movement of the directional gyro. A consequent variation or change occurs in the continuity of the output of the flux valve 30 which effects the operation of the means which is responsive thereto, in this instance, the phase sensitive amplifier 41. The output of the phase sensitive amplifier, in turn, effects the operation of the gyro precessing means to control the same in such a manner that the torque exerted thereby restores the flux valve 30 to the original position from which the described series of operations started. Also, by the particular mounting of the compass unit on the rotor bearing case employed in this form of the invention, it will be understood that the compass is partially stabilized in a horizontal plane.

With reference to Figs. 4 to 7, inclusive, a modified form of the improved instrument is shown, the same being generally similar in character to that hereinbefore described. In this form of the invention, the enclosing casing for the instrument is indicated at 10' and the same differs from that previously described in that the azimuthal indication is obtained indirectly, in this instance, from the instrument by means of a repeater compass controlled therefrom as hereinafter more particularly described. Elements in the directional gyro and the flux valve which are similar to those previously described are indicated in Figs. 4 to 7, inclusive, by priming the same base reference numbers heretofore utilized. In the considered form of the invention, the jack and plug connection box 42' is employed to enclose the flux valve unit 30', the same being rotatably mounted and positioned in azimuth by the directional gyro by means of the vertical ring 16' in this instance. The trunnion 18' of the vertical ring is extended through the casing 10' and suitably joined to the topmost of the two holding members 37' and 38' in which the flux valve 30' is mounted. Coaxial with the trunnion 18' and projecting from the bottom holding member 38' is a further shaft indicated at 65 which rotates with both the vertical ring 16' and the flux valve unit 30'. The slip rings 47' by which the energy is supplied to spin the gyro rotor are situated on shaft 65 in this instance. Also in the construction employed, shaft 65 projects below the box 42' and is used to position the rotor of a position transmitting device of the Selsyn type as indicated at 66. The casing for this transmitter is suitably connected to the base of the box 42 as shown in Figs. 4 and 5. The receiver associated with the described transmitter is indicated at 67. In this illustratively utilized position repeating arrangement, the stators of the Selsyn transmitter and receiver are Y-connected and the rotor windings are energized from the common source 35' by way of leads 68 and 69, respectively, Fig. 7. The receiver 67 which is situated at a distance from the controlling gyro compass instrument positions a compass card 70 through means of the rotor thereof as well understood in the art.

The instrument proper which includes the directional gyro, flux valve and position transmitter is situated so that the flux valve is located in a normally horizontal plane and the axis of the coaxial ring 16' and shaft 65 is vertical. The housing for the related instruments is pendulously mounted in a universal supporting structure for the same formed by gimbal 71 in which the housing is pivotally mounted by means of trunnions 72 and 73. Arranged in perpendicular relation to the axis defined by trunnions 72 and 73 are the gimbal ring trunnions 74 and 75 which in turn are journaled in suitable bearings in the respective fixed mounting members 76 and 77.

The torque exerting means for correcting tilt of the gyro rotor bearing case 19' about the axis of the same defined by trunnions 20' and 21' is shown in the form of opposite directed nozzles 78 and 79 mounted on the case 19' and receiving air from the self contained air pump within the case 19' which is driven by the gyro rotor. In this instance, the air discharged from the nozzles 78 and 79 differentially impinges on the respective knife edge defining members 80 and 81 which are provided by one of the surfaces of the laterally extending plates 82 and 83. Plates 82 and 83 are either fixedly mounted on the vertical ring 16' or are provided as an integral part of the ring. It will be apparent that when the case 19' tilts out of a normal position, one of the oppositely directed air jets issuing from the nozzles is effective to exert a torque about the axis of the vertical ring 16' to restore the bearing case 19' to its normal position.

In the present form of the invention, the precessing means for the gyro instrument includes two further nozzle elements as indicated at 84 and 85 which are situated on the case 19' and receive their air from the same pump source as utilized for the previously described nozzles 78 and 79. The controlling means for nozzles 84 and 85 are provided by the extending vanes respectively designated at 86 and 87, the same being positioned to normally intercept equal portions of the air issuing from the nozzles so that the respective torques exerted thereby about the horizontal axis of support of the rotor bearing case 19' defined by the trunnions 20' and 21' are balanced. The vanes 86 and 87 are mounted on a common shaft 88 which is positioned by a moving coil motor generally indicated at 89 in Figs. 5 and 6. The construction of the moving coil motor 89 is represented diagrammatically in Fig. 7 which shows the same to include an electromagnetic core 90 controlled by an exciting winding 91 which is adapted to directly receive the output of the flux valve winding 36' by way of leads 92, slip rings 93 and leads 94. The moving coil element is placed in the field of the electromagnetic core 90 by means of a suitable bearing mounted frame on which the coil 95 is located so that the same is normally positioned in perpendicular relation to the exciting coil 91. Coil 95 is excited from the primary source of electrical energy 35' by way of leads 96, frequency doubler 40', leads 97, slip rings 98, leads 99, slip rings 100 and leads 101. The operation of this form of the instrument is similar to that hereinbefore described, the pneumatic precessing means in this instance being controlled by the moving coil motor in response to a variation in the output of the flux valve 30' to restore the flux valve to its original position in azimuth.

As many changes could be made in the above construction and many apparently widely different embodiments of this invention could be made without departing from the scope thereof, it is intended that all matter contained in the above description or shown in the accompanying drawings shall be interpreted as illustrative and not in a lmiting sense.

What is claimed is:

1. A gyro magnetic compass comprising the combination of a gyro instrument including an azimuth indicating vertical ring having vertically extending trunnions for rotatably mounting the same and a directional gyro rotor bearing case mounted on said ring to pivot about a normally horizontal axis, a flux valve fixed to and positioned in azimuth by an extending portion of one of the ring trunnions, means for applying torques to the gyro to precess said vertical ring, and means responsive to a variation in the output of said flux valve due to a change in the azimuthal position of the same in the earth's field for controlling said vertical ring precessing means to thereby restore the flux valve element to its original position.

2. A gyro magnetic compass comprising a directional gyro including a vertical ring mounted to rotate about a vertical axis, a rotor and rotor bearing case, said case being rotatably supported on said vertical ring for freedom about a normally horizontal axis, a flux valve mounted in substantially a horizontal plane on said case and stabilized thereby about the horizontal supporting axis of the case, means for opposing tilt of said case about said horizontal axis thereby maintaining said flux valve in said horizontal plane, means for precessing the vertical ring of said gyro in azimuth, and electrical means responsive to variations in output of said flux valve due to azimuthal changes in position thereof for controlling said precessing means.

3. A gyro magnetic compass comprising a directional gyro including a casing, a vertical ring having trunnions journaled on a vertical axis in said casing, a rotor and rotor bearing case pivotally supported on said ring, means for pendulously supporting said casing, a flux valve carried by and positioned in azimuth by an extending portion of one of said trunnions, means for applying torques to the gyro to precess said vertical ring, and means responsive to the output of said flux valve for controlling said precessing means.

4. A gyro magnetic compass comprising a directional gyro, a flux valve including exciting and pick-up coils carried by and positioned in azimuth by said directional gyro, a source of periodically varying current connected to said exciting coil, means for applying a torque to precess said gyro in azimuth, and electrical control means for controlling the operation of said torque-applying means including phase-sensitive means connected to receive the alternating voltage outputs from the pick-up coils of said flux valve, and means for supplying electrical energy to said phase-sensitive means having a frequency double that of said current source, said phase-sensitive means being adapted to effect an operation of said torque-applying means in one direction or the other depending upon the phase sense of the output voltages of said flux valve with respect to the electrical energy supplied from said last-mentioned means.

5. A gyro magnetic compass comprising a directional gyro including a vertical ring mounted for freedom about a normally vertical axis and a rotor bearing case rotatably supported on said ring on a normally horizontal axis, means for applying a torque to said gyro about said horizontal axis in either direction to precess said gyro in azimuth in either direction, a flux valve carried by the rotor bearing case of said gyro and positioned in azimuth thereby for generating signal voltages having a magnitude and a phase sense depending upon the position of said valve in the earth's magnetic field, and electrical means including phase-sensitive means responsive to the output signal voltages of said flux valve for controlling said torque-applying means to operate in a direction dependent upon the phase sense of said flux valve output voltages.

LENNOX F. BEACH.